United States Patent [19]
Wong

[11] Patent Number: 5,140,966
[45] Date of Patent: Aug. 25, 1992

[54] CARBURETOR FOR AN INTERNAL COMBUSTION ENGINE

[76] Inventor: Men L. Wong, 17203-102 Street, Edmonton, Alberta, Canada, T5X 3X5

[21] Appl. No.: 710,009

[22] Filed: Jun. 4, 1991

[51] Int. Cl.$^5$ ............................................. F02M 31/00
[52] U.S. Cl. ..................................... 123/543; 123/547; 261/145; 261/156
[58] Field of Search ............... 123/543, 547, 545, 546, 123/552, 570; 261/145, 156; 165/52; 60/605.2

[56] References Cited

U.S. PATENT DOCUMENTS

| | | | |
|---|---|---|---|
| 2,956,559 | 10/1960 | Johnson | 123/570 |
| 3,942,495 | 3/1976 | Kobayashi et al. | 123/547 |
| 4,079,715 | 3/1978 | Masaki et al. | 123/543 |
| 4,250,711 | 2/1981 | Zehnder | 60/605.2 |
| 4,291,760 | 9/1981 | Argvle et al. | 123/570 |
| 4,368,163 | 1/1983 | Covey | 261/145 |
| 4,480,622 | 11/1984 | Hoffman | 261/145 |
| 4,515,135 | 5/1985 | Glass | 165/52 |

*Primary Examiner*—E. Rollins Cross
*Assistant Examiner*—M. Macy

[57] ABSTRACT

Carburetors and fuel injection systems are used to facilitate a combustile mixture of air and fuel for internal combustion engines. Inherently, the fuel in this mixture is mostly in liquid droplets. However, it is the vaporous fuel which combines with the air gives an explosive mixture; and it is this mixture that can be exploded during the short engine power stroke time available. The rest of the fuel in liquid form simply burns or exhausts to the environment, hence impairing the efficiency of the engine and polluting the environment. In this invention, liquid fuel is vaporized and combined with air to form an explosive mixture before introduction into the engine. In this design, ultrasonic technology is employed to atomize the fuel in the form of fine fuel mist. This mist is then injected into a specially designed heat exchanger, in which hot engine exhaust gas is brought in to cause this subspension of fuel mist to vaporize. Subsequently, this vaporized fuel combines with the intake air to form an explosive mixture. In this process, microcomputer technology is employed to control the precise air to fuel ratio of the mixture according to the degree of fuel vaporization and the demand of the engine operation. The fuel in this mixture is in a vaporous state; therefore utilization of the fuel is maximized.

5 Claims, 4 Drawing Sheets

CARBURETOR FOR AN INTERNAL COMBUSTION ENGINE

BACKGROUND OF THE INVENTION

In carburetors, the intake air breaks up the liquid fuel into droplets. Together the air and the atomized fuel form the combustible mixture for internal combustion engines. Unfortunately, there is only the small area around each droplet of liquid fuel that is vaporized, leaving the rest still in liquid form when this mixture enters the engine. It is the vaporous fuel combined with the air which gives an explosive mixture; and it is this mixture that can be exploded during the short engine power stroke time available. The remaining portion of fuel, still in liquid form, simply burns or exhausts to the environment; hence impairing the efficiency of the engine and polluting the environment. This situation is more apparent for low speed and low load operations when the intake air velocity is too low to effectively break up the fuel droplets. The fuel injection systems, employed for some internal combustion engines today, alleviate the problem to some extent by injecting the liquid fuel directly into the intake air stream via a nozzle to produce finer droplets and providing a more precise air/fuel mixture. Unfortunately, even the finer droplets remain mostly in liquid form.

Realizing this problem, there were numerous designs for vaporizing the fuel by inventors in the past and some of them were granted patents. However, the problems for making this concept practical have not been fully overcome. There have been many attempts to improve the vaporization state of the fuel by employing ultrasonic technology and engine exhaust heat for fuel vaporization. In this section, the shortcomings of these attempts and in particular the problems encountered with this type of carburetion, namely vaporization carburetion, will be outlined.

The most common designs to vaporize the fuel is to provide an exhaust gas heated, engine coolant heated, or electrically heated heat exchanger in between the conventional carburetor and the intake manifold. The main disadvantage of this type of designs is the overall heating of the intake air. This heating tends to promote detonation; the uncontrollable ignition of the fuel mixture inside the engine cylinder. Another disadvantage is the reduction of the maximum power output of the engine. As the intake air temperature increases, the air mass going into the engine decreases due to the physical property that at higher air temperatures, the air density is lowered. In effect the maximum power produced by the fuel and air explosion is lessened. Some of these designs divert a portion of the intake air and fuel into the heat exchanger. Subsequently, only a portion of the fuel is vaporized and the majority of the fuel is still in liquid form. In engine coolant heated systems, the temperature of the engine coolant is not high enough for fuel vaporization. In electrically heated systems, extra batteries may be needed for providing the electrical power to the heat exchanger, and in general extra engine power is needed to generate this electricity to be effective.

Other attempts involved employing ultrasonic technology to produce finer droplets. Commonly, an ultrasonic transducer, which is made of piezoelectric crystal, is mounted between the conventional carburetor and the intake manifold. As the intake air and the fuel pass through the ultrasonic transducer, some droplets of fuel come in contact with the ultrasonic transducer. Vibrating at high frequency, the transducer breaks the fuel into finer droplets. However, these finer droplets remain mostly still in liquid form. It is also known that air is a poor medium for ultrasonic wave transmission, therefore ultrasonic wave energy is substantially reduced to have little effect on the droplets which are not in immediate contact with this ultrasonic transducer.

Another approach is a stand alone carburetor which consists of a few basic modules for conditioning the fuel. This is the approach this invention is based on. Commonly, this design has four basic modules, they are a fuel atomization chamber, a heat exchanger, heat exchanger temperature control apparatus and fuel metering mechanism. Earlier attempts usually employ mechanical spray nozzle for fuel atomization with bulky heat exchanger, simple heat exchanger temperature control and fuel metering mechanisms.

One of the main problems encountered in vaporization carburetor is gumming. Gumming occurs when high molecular weight components of the fuel, referred to as high ends of the hydrocarbon, cannot vaporize and begin to stick to the heat exchanger surface, in effect lowering the efficiency of the heat exchanger to a stage that renders this approach impractical. Some designs have heater elements submersed in the fuel for fuel vaporization. Light ends of the hydrocarbon simply boil off and the high ends remain. Obviously, gumming is inevitable in this situation.

The disadvantage of employing mechanical spray for fuel atomization is the production of very coarse fuel droplets. As these droplets contact the heat exchanger hot surface, light ends of the hydrocarbon vaporize and cool the hot surface. Subsequently, high ends of the hydrocarbon cannot vaporize and start to accumulate.

Some designs introduce the amount of atomized fuel according to the engine demands; controlled by the engine vacuum or activated by the throttle position. Some designs simply rely on the intake air to meter the atomized fuel like the conventional carburetor does. These type of designs cannot satisfy transient requirements such as load variations, acceleration or deceleration because of the lag effects related to the fuel reaching the engine from its point of injection. This time delay is due to the time it takes for the fuel to pass through the heat exchanger.

Vaporization of fuel requires abundant heat. Commonly heat from the engine exhaust is used for this purpose because this heat is the waste byproduct from the consumed fuel. Most of the previous designs cannot make use of a large amount of engine exhaust because the engine exhaust is too hot to be injected in large quantity into the heat exchanger without risk of igniting the fuel inside. Realizing this difficulty, some designs divert only a portion of the engine exhaust into the heat exchanger. Unfortunately, the heat obtained from this portion of the exhaust is not adequate for thorough fuel vaporization. In addition to this, the exhaust gas flow is relatively slow which is considered to be laminar flow inside the heat exchanger. It is known that laminar flow yields poor heat transfer efficiency. In most cases, a large heat exchanger is required for thorough fuel vaporization.

Depending on the design, the diversion of the exhaust gas sometimes creates high engine exhaust back pressure. This high exhaust back pressure affects the efficiency of the engine. As the exhaust valve of the engine opens, it is desirable to expel the exhaust gas out of the cylinder as freely as possible. However, if the passage of the exhaust is obstructed to divert the exhaust gas into the heat exchanger, the extra engine power would be needed to push the exhaust gas out of the engine cylinder.

Another problem associated with making the vaporization carburetor practical is the control of the heat exchanger temperature. The temperature of the engine exhaust varies with different operating conditions of the engine. In particular, the temperature control is fairly demanding during transient situations such as; load variations, acceleration and deceleration. The temperature of the engine exhaust is high enough to ignite the fuel, therefore as more engine exhaust is diverted into the heat exchanger, more demands are placed upon the temperature control mechanism. In addition, as the fuel vaporizes, the heat exchanger requires more heat. Therefore means have to be provided to control the temperature of the heat exchanger in response to the incoming engine exhaust gas and the effect of the fuel vaporization in order to be effective.

The fuel prepared by the vaporization carburetor is highly explosive. This ensures a thermodynamic advantage when this explosive mixture is ignited inside the engine cylinder. Proper means have to be designed to protect this vaporous fuel from igniting in case of backfiring of the engine. Backfire occurs in an engine when the mixture is too lean, resulting in the time needed to complete the combustion being extended well into the intake cycle. A backfire arrester has to be able to arrest the fire and at the same time provide non-restrictive passage for the vaporous fuel.

The main advantage of the vaporization carburetor is the ability to extend the lean limit. The lean limit means the maximum air to fuel ratio for the engine without apparent backfiring, misfiring, detonation or any undesirable effect due to lean combustion. The effectiveness of fuel saving is the capability of the design to control the precise air to fuel ratio in all operations of the engine. The previous inventions apparently have not addressed this fundamental problem. Although a vaporization carburetor offers advantages in fuel economy and exhaust emission, making this concept practical is not an easy process.

SUMMARY OF THE INVENTION

The objective of this invention is to produce a carburetor which can provide fuel in vaporous state and combine with air to form an explosive mixture before introduction into the engine, thereby maximizing the utilization of the fuel during the engine power stroke cycle. This invention consists of five main modules, they are fuel atomization chamber, heat exchanger, heat exchanger temperature control apparatus, backfire arrester and fuel metering mechanism. The unique designs of these modules facilitate features that prevent gumming, provide high efficient heat transfer between engine exhaust gas and the fuel, improve heat exchanger temperature control reliability and sensitivity, and provide optimum air/fuel mixture for engine comsumption.

In the fuel atomization chamber, ultrasonic wave is employed to atomize the fuel for its ability to produce ultra fine fuel droplets. The piezoelectric ultrasonic transducer is submersed underneath the fuel for maximum atomization effect. Because the fuel droplets are so fine when they contact the heat exchanger hot surface, the light ends of the hydrocarbon vaporizes rapidly without lowering the surface temperature significantly, therefore the high ends of the hydrocarbon still has the required condition to vaporize eventually. Hence gumming is not possible. It should be noted, the amount of atomized fuel is prepared independent of the engine demand. The ultrasonic transducer always produces adequate atomized fuel for maximum engine operation, and the vaporized fuel in the heat exchanger is always maintained in saturated equilibrium.

The heat exchanger is specially designed to provide efficient vaporization of the fuel and minimize gumming occurence. Baffles are used to divert the fuel droplets to travel through the heat exchanger in a zig zag manner so that the volume of the heat exchanger is used effectively. The fuel droplets and exhaust gas are travelling in a counter flow manner so as to maximize the output vapour fuel temperature. The fuel droplets travel from the top to the bottom and the vaporized fuel is extracted from the bottom of the heat exchanger. As the fuel droplets travels downwards, the light ends of the hydrocarbon vaporize rapidly and some of the high ends of the hydrocarbon, not yet vaporized, also travel downwards with the assistance of gravity. As the heated surface becomes hotter because of the counter flow arrangement, the high ends of the hydrocarbon eventually vaporize as well. This counter flow design and from-top-to-bottom fuel path are to facilitate more time and high temperature condition to vaporize the high ends of the hydrocarbon. It should be noted, since high intake air temperature promotes detonation, the air heated is only a small portion of the total intake air. This small portion of the heated air is used as a carrier for the fuel droplets into the heat exchanger.

In this invention, a pair of unison butterfly valves is employed for the diversion of the engine exhaust gas into the heat exchanger. They are designed so that the total cross-sectional exhaust area is preserved independent of the valve positions. This is to ensure the free passage for engine exhaust gas. An air blower is also employed to draw the engine exhaust gas into the heat exchanger. The combination of these unison valves and the air blower effectively divert the engine exhaust gas into the heat exchanger without increasing the engine exhaust back pressure. This same air blower is also employed for recirculating the exhaust gas in the heat exchanger. Since the exhaust gas is circulating inside the heat exchanger at high velocity by this air blower, uniformly high temperature throughout the heat exchanger is achieved and instead of laminar flow of the exhaust gas, turbulent flow is established which contributes higher heat transfer efficiency. As the cooled exhaust gas of the recirculation line from the outlet of the heat exchanger is combined with the hot engine exhaust gas, more hot engine exhaust gas can be diverted into the heat exchanger without risking igniting the fuel inside, therefore extraction of the waste heat from the engine exhaust can be maximized. With this unique heat exchanger design and the employment of this circulation blower, the heat exchanger size is substantially reduced without degrading the degree of fuel vaporization.

A temperature sensitive bimetal actuator, situated in the gas streams of the engine exhaust gas and the recirculation exhaust gas, is employed such that it responds to both the incoming engine exhaust gas temperature and the recirculation exhaust gas temperature. In turns, the bimetal actuator controls the heat exchanger inlet temperature via a pair of unison butterfly valves. In effect, this temperature control mechanism responds to the combination of the source of the heat and the effect of the vaporization for the control.

A specially designed backfire arrester is situated between the intake manifold and the heat exchanger to prevent the backfiring of the engine from igniting the fuel inside the heat exchanger. A large fine mesh metal screen is incorporated to arrest the fire by dissipating the heat of the fire and at the same time provide a nonrestrictive passage for the vaporous fuel.

The fuel coming out of the heat exchanger is in a vaporous state. It is observed that the lean limit can be extended according to the degree of fuel vaporization. A specially designed microcomputer control system consists of flow and temperature sensors and an electromechanical valve actuator is employed to control the precise air to fuel ratio of the mixture according to the degree of fuel vaporization and the engine requirement.

The fuel mixture as prepared by this invention consists of an essentially homogeneous charge of vaporized fuel and air. When this mixture is ignited inside the engine cylinder, releasing the energy in this fuel by rapid explosion to produce constructive mechanical output is maximized and harmful pollutants due to incomplete combustion are reduced. An added benefit is the reduction of the engine operating temperature such that useful life of the engine components can be prolonged.

BRIEF DESCRIPTION OF THE DRAWING

The drawings which illustrate embodiments of the invention are as follows.

DETAILED DESCRIPTION OF THE INVENTION

Figure 1:
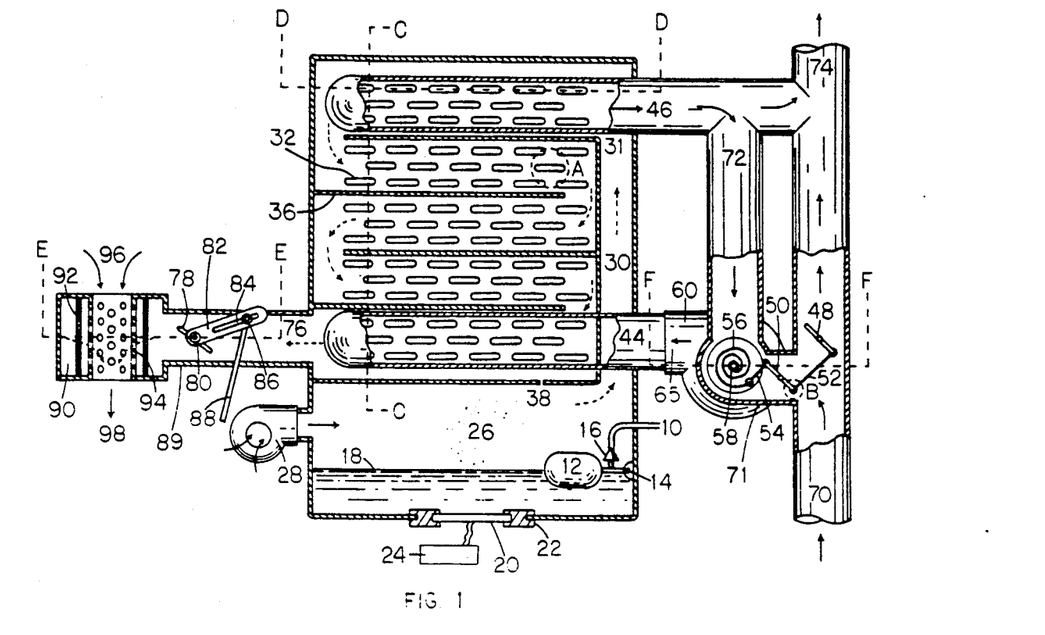
FIG. 1 is the vertical cross-sectional view of the carburetor.

Referring to the drawings, in particular FIG. 1, liquid fuel is atomized in the fuel atomization chamber ( item 10 to 28 ), and then injected into the heat exchanger ( item 30 to 46 and 76 ) for vaporization. The temperature of the heat exchanger is controlled by the temperature control apparatus ( item 48 to 74 ) such that atomized liquid fuel in the heat exchanger can be thoroughly vaporized. The fuel after vaporized is combined with the main intake air 96 via the vapour fuel metering valve and backfire arrester ( item 78 to 94 ) to form the explosive mixture 98 for the engine consumption. A specially designed microcomputer control system ( FIG. 8, 9 and 10 ) is employed for precise air to fuel ratio control according to the degree of fuel vaporization and the engine demand. The following of this section describes each module in detail.

In the fuel atomization chamber, liquid fuel enters the chamber via tube 10. When the level of the fuel 18 drops, the float 12 with pivot 14 holding it in place also drops, causing the valve 16 to open, thereby liquid fuel enters the chamber. Similarly, as the level of the fuel 18 rises, the valve 16 closes, and stops the liquid fuel from entering. Hence, the level of the liquid fuel 18 in the chamber can be maintained. The ultrasonic transducer 20 is mounted in place by a petrol resistant gaskette 22. This ultrasonic transducer is made of piezoelectric crystal, fabricated to have resonance frequency in the ultrasonic range. Electronic circuitry 24 is used to power this ultrasonic transducer, causing it to vibrate at its resonance frequency. The ultrasonic wave produced by this ultrasonic transducer travels through the liquid fuel. It breaks up the surface tension of the fuel and causes the fuel to vibrate into the air in the form of a fine atomized fuel mist 26, which is often referred to as liquid droplets of fuel. An air blower 28 is used to force this suspension of fuel mist into the specially designed heat exchanger via path 30. Optionally, an air filter can be added in the air inlet of this air blower 28 to filter the air. It should be noted, only a small amount of air is used as a carrier for the fuel mist and it is only this small amount of air that is heated. The majority of the intake air 96 for combustion is still unheated before entering the engine. It is observed that by minimizing the amount of heated intake air, detonation caused by high intake air temperature is minimized and the maximum power output of the engine is also preserved. The ultrasonic technology is employed for fuel atomization because of its ability to produce ultra fine fuel droplets. When these ultra fine droplets contact the heated surface of the heat exchanger, the fuel is vaporized so readily that gumming is not possible. The ultrasonic transducer in this design always produces adequate atomized fuel for maximum engine operation. The fuel mixture inside the heat exchanger is always maintained in saturated equilibrium by the excess production of this atomized fuel.

Figures 2, 3:
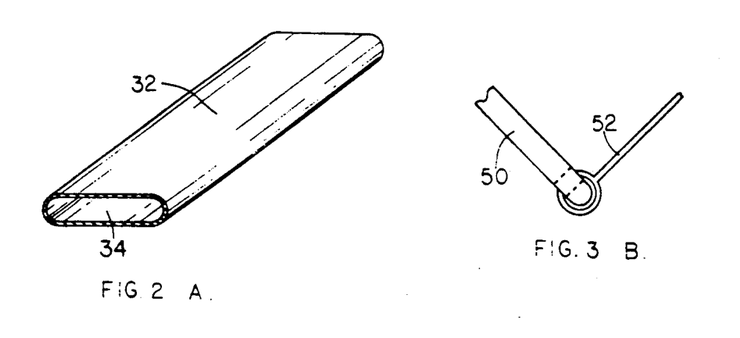
FIG. 2 is the detail view of the heat exchanger element labelled A in FIG. 1 which is made of very thin metal flat hollow tube for exhaust gas passage.
FIG. 3 is the detail view of the valve linkage labelled B in FIG. 1.
Figure 4:
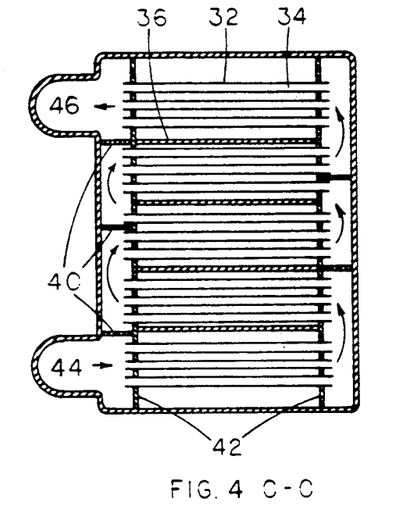
FIG. 4 is the vertical sectional view of the heat exchanger on the line C—C in FIG. 1 detailing the exhaust gas passage and the direction of flow.
Figure 5:
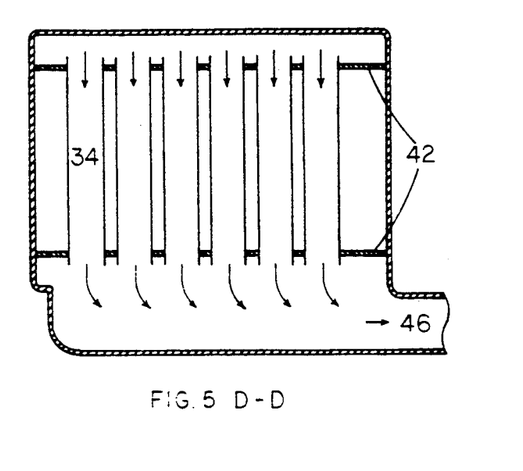
FIG. 5 is the horizontal sectional view of the heat exchanger on the line D—D in FIG. 1 indicating the direction of exhaust gas flow.
Figure 6:
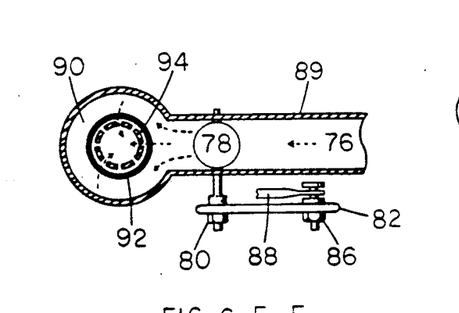
FIG. 6 is the horizontal sectional view of the vapour fuel metering valve and the backfire arrester on the line E—E in FIG. 1 indicating the direction of vaporized fuel flow.

In the heat exchanger, the air laden with liquid droplets of fuel enters the inlet 31 at the top of the heat exchanger. As it travels in zig zag fashion down the heat exchanger, fuel vaporizes rapidly in contact with the heated surface 32 which consists of flat thin metal hollow tubes. The flow of this fuel laden air is created by the blower 28. After vaporization, the vaporized fuel is extracted from the outlet 76 at the bottom of the heat exchanger for engine consumption. It is observed that the finer the atomized fuel droplets, the more rapidly the vaporization occurs in the heat exchanger and less gumming occurs. Baffles 36 are configured to provide a zig zag passage for the atomized fuel to travel so that the volume of the heat exchanger is used effectively. The passages of the exhaust gas and atomized fuel are in a counter flow manner for the most effective heat transfer and minimal occurence of gumming. The hot exhaust enters the inlet 44 at the bottom of the heat exchanger. The end plates 42 ( FIG. 4, 5 ), where the hollow tubes 32 are mounted, separate the exhaust gas and the atomized fuel. Baffles 40 ( FIG. 4 ) enable the exhaust gas to travel upward in a zig zag fashion through the inside of the flat hollow tubes 34 ( FIG. 2, 4, 5 and exit from outlet 46 at the top of the heat exchanger. As the atomized fuel travels down the heat exchanger, temperature becomes higher because of the counter flow arrangement. It is known that high ends of the hydrocarbon require more time and higher temperature to vaporize. This counter flow arrangement and the from-top-to-bottom vapour path design ensure that the high ends of the hydrocarbon have adequate time and a high enough temperature to vaporize. If there is any fuel still in liquid form, passage 38 is designed to allow this liquid fuel to flow back to the fuel atomization chamber for the new generation. This heat exchanger also serves as a reservoir for this vaporized fuel which is maintained at saturated equilibrium, independent of the engine demand, and in optimum combustion state ready for engine consumption.

Figure 7:
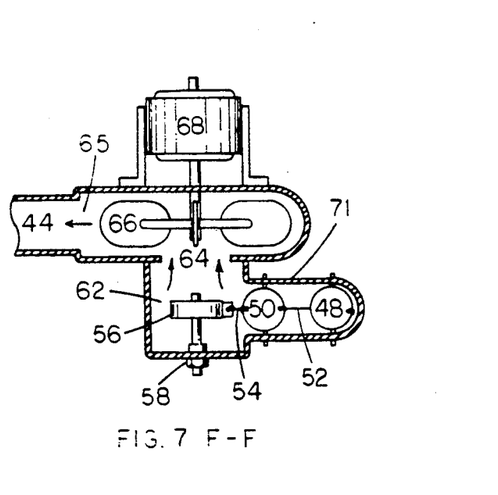
FIG. 7 is the horizontal sectional view of the temperature control apparatus on the line F—F in FIG. 1 indicating the direction of exhaust gas flow.

The temperature of the heat exchanger is controlled by a specially designed apparatus which consists of a temperature sensitive bimetal actuator 56, valves 48 and 50, and a circulation air blower 60. This bimetal actuator 56, situated in inlet 64 ( FIG. 7 ) of the circulation blower 60, contracts or expands in response to the temperature. This in turn controls the two butterfly valves 48 and 50. Valve 48 is situated in the exhaust line 70 of the internal combustion engine. Valve 50 is situated in the secondary exhaust line 71 leading from the exhaust line 70. The butterfly valves 48 and 50 are controlled in unison via linkages 54 and 52 so that when one valve is closed the other is open in exact proportion. This inverse coupling movement of these valves enables a constant cross-sectional area for the flow of the exhaust. The circulation air blower 60, with the fan 66 ( FIG. 7 ) driven by the motor 68 ( FIG. 7 ) draws the engine exhaust gas 70 via the secondary exhaust line 71 and the cooled recirculation exhaust gas via the recirculation line 72 into the mixing chamber 62 ( FIG. 7 ) where the temperature sensitive bimetal actuator 56 resided. It should be noted that the motor 68 ( FIG. 7 ) is thermally isolated from the fan 66 ( FIG. 7 ) and the rest of the blower housing so that the motor cannot be damaged by excessive temperature. This bimetal actuator controls the position of valves 48 and 50 in response to the temperature in this chamber 62. This unique unison valves 48 and 50 and the circulation blower 60 arrangement enables the amount of engine exhaust gas 70 to be diverted into the heat exchanger proportionally according to the demand without increasing the engine exhaust back pressure. The proportion of the engine exhaust gas 70 and the recirculation exhaust gas 72 is determined by the position of the valves 48 and 50. Hence the heat exchanger inlet temperature can be regulated at a predetermined optimum temperature.

The hot exhaust is forced by the air blower 60 through the outlet 65 of the blower into the inlet 44 at the bottom of the heat exchanger. Inside the heat exchanger, heat of the exhaust is transferred to the fuel causing it to vaporize. After passing through the heat exchanger, the exhaust gas exits from the outlet 46 at the top of the heat exchanger and becomes cooler, a portion of this exhaust circulates back to the heat exchanger via the recirculation line 72 and the rest combines with the main exhaust 70 and is exhausted to the environment 74 or via a muffler system. The exhaust gas is circulated within the heat exchanger by this circulation blower 60. This enables a more uniformly high temperature throughout the heat exchanger, thereby vaporization of the fuel is achieved more readily. This circulation blower also creates a turbulent flow of the exhaust gas, as opposed to laminar flow, inside the heat exchanger, thus further enhancing the heat transfer efficiency. Normally, the engine exhaust is too hot to be injected into the heat exchanger in large amount without risking igniting the fuel. But since this circulation blower draws cooled recirculation exhaust gas 72 and combines it with the engine exhaust gas 70, large amount of engine exhaust can be utilized. The heat of this engine exhaust, which otherwise would have been wasted can be extracted for vaporization.

The unique temperature control apparatus, which consists of the circulation blower 60, bimetal actuator 56 and the dual unison valves 48 and 50, facilitates a unique control mechanism. The bimetal actuator situated in the gas streams of engine exhaust gas 70 and the recirculation gas 72 constitutes a combination of feedforward and feedback control system. During the startup, valve 48 is closed and valve 50 is open, therefore the bimetal actuator responds mainly to the temperature of the engine exhaust gas 70. This control scheme which controls the effect of the engine exhaust gas 70 by adjusting the dual unison valves 48 and 50 before it materializes is called feedforward control. In this situation, it is particularly important because if the temperature of the heat exchanger is raised by the engine exhaust gas 70 to some point, the fuel in the heat exchanger might be ignited. Obviously, it is desirable to employ feedforward control during startup phase of the operation. As the temperature rises, the bimetal actuator 56 closes valve 50 to limit the engine exhaust gas 70 going into the heat exchanger, the temperature which the actuator 56 is sensing is primarily the recirculation exhaust gas 72. A control scheme which controls the effect after it has materialized, in this case the actuator senses the recirculation exhaust gas temperature 72 and controls the dual unison valves 48 and 50 to achieve the desired temperature, is called feedback control. During steady state, it is desirable to consider the amount of heat used in the heat exchanger and then control the amount of heat going into the heat exchanger. Therefore feedback control is preferred during the steady state operation. Because of the safety reason, this temperature control apparatus is designed to provide combination of feedforward and feedback control during engine operation. The temperature setpoint of this counter flow heat exchanger can be adjusted by rotating the bimetal actuator 56 and fixing it in position by tighting the nut 58.

The atomized liquid fuel after passing through the heat exchanger becomes truly vaporous. This vaporous fuel comes out of the bottom of the heat exchanger via outlet 76 into the fuel vapour passage 89. Depending on the demand of the engine operation, the amount of fuel is metered by the vapour fuel metering valve 78, which is a butterfly valve connected through an extension arm 82 and a rod 88 to the electro-mechanical actuator 110 ( FIG. 8 ). This actuator is controlled by a specially designed microcomputer control system. Detailed description of this control system is presented later in this section. As the engine throttle valve opens, the vapour fuel metering valve also opens in unison according to the predefined control strategy. The idling position of this vapour fuel metering valve can be adjusted by rotating the valve 78 to the desired position and fixing in place by tighting the nut 80. The slot 84 in the extension arm 82 is designed to provide the span adjustment on the fuel metering valve. The rod 88 can be slided along the slot 84 for this span adjustment and can be fixed in position by tighting the nut 86. This metered vaporous fuel is then passed through a specially designed backfire arrester in which it is combined with the main intake air 96 before being injected into the intake manifold 98 of the engine. The main intake air 96 is filtered air, the air filter is not shown in the drawing. This backfire arrester consists of a cylinder having porous sidewalls 94 of fine mesh metal screen 92. During the engine operation, the vaporized fuel travels through the passage 90 substantially surrounding the cylinder such that vaporized fuel from this passage passes through the porous sidewalls 94 of the cylinder thereby mixing with the intake air 96 to from the explosive mixture for engine consumption. Normally, the fine mesh metal screen imposes resistance to air passage, therefore a large fine mesh screen is employed to compensate this effect. When backfiring occurs, heat is dissipated in the fine mesh metal screen thereby protecting the vaporized fuel from ignition.

Figure 8:
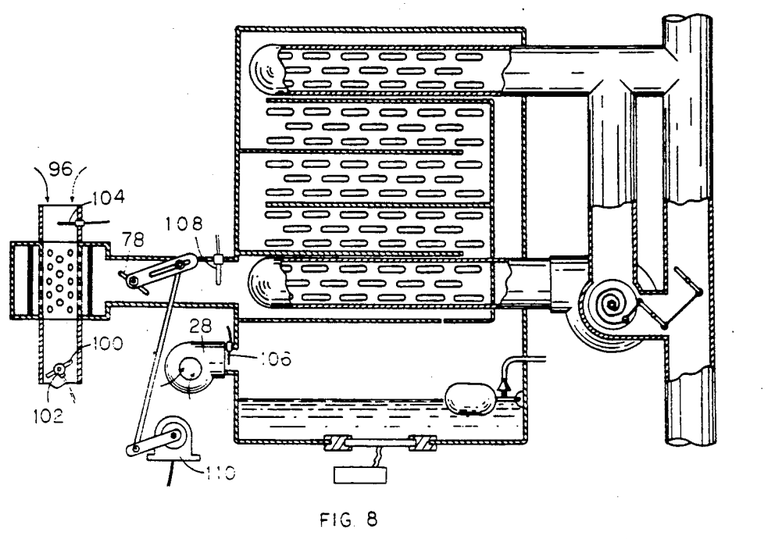
FIG. 8 is the vertical cross-sectional view of the carburetor detailing the instrumentation of the microcomputer control system.

In order to control the precise air to fuel ratio of the mixture, a specially designed microcomputer control system is employed. This microcomputer control system gathers information from the various sensors, performs the calculations and activates the control accordingly. FIG. 8 details the various sensors and the actuator arrangement. The engine demand is sensed by the throttle valve position sensor 102 which measures the opening angle of the throttle valve 100 and outputs a corresponding electrical signal to the microcomputer. According to this demand signal the microcomputer controls the vapour fuel valve 78 via the electro-mechanical actuator 110 accordingly. This initial control output is not very precise, it is designed to provide a fast response to the engine demand. However, this initial response is determined by the data obtained from the previous laboratory experiments on the engine under control, therefore the resulting fuel mixture should not deviate much from the optimum. After the initial response, the microcomputer reads in the main intake air flow 96 via the flow sensor 104 and the heat exchanger air flow via sensor 106. Since the heat exchanger is a closed system, the air flowing through the air blower 28 is the same as the air flowing through the vapour fuel valve 78. The microcomputer also reads in the vapour fuel temperature via sensor 108. Since the vaporous fuel inside the heat exchanger is maintained in saturated equilibrium, with known vapour fuel temperature and the heat exchanger air flow, fuel flow is readily calculated. With known air flow which is the summation of the main intake air flow and the heat exchanger air flow, air to fuel ratio is obtained. From the experiments, it is observed that the lean limit is the function of the degree of fuel vaporization which can be estimated by the vapour fuel temperature, therefore the lean limit can be calculated. By comparing the actual air to fuel ratio with the lean limit, the microcomputer refines the control by adjusting the vapour fuel valve 78 via the electro-mechanical actuator 110 so as to achieve the optimum air to fuel ratio.

Figure 9:
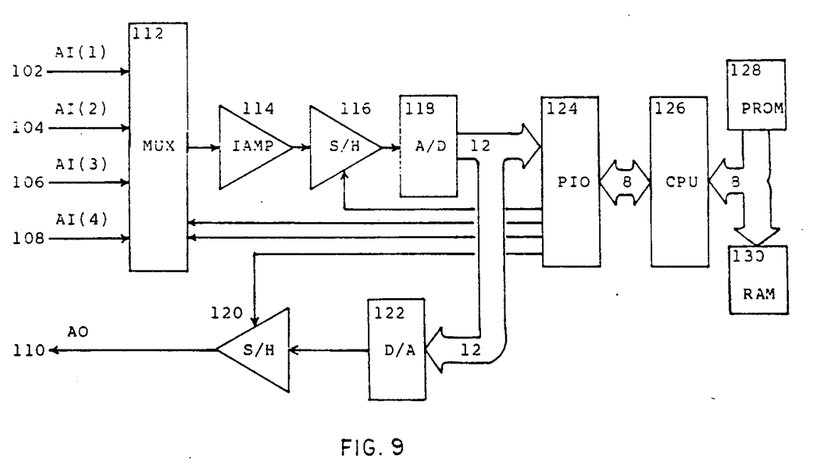
FIG. 9 is the hardware block diagram of the microcomputer control system.

FIG. 9 is the hardware block diagram of this microcomputer control system. All the components shown in the diagram are integrated circuits. The sensor signals 102, 104, 106 and 108 are presented to the MUX as AI(1), AI(2), AI(3) and AI(4) respectively. AI stands for Analog Input. The component 112 MUX which denotes Multiplexer presents one of these analog signals to its output according to the selection signal from the microprocessor. Optionally, component 114 IAMP which stands for Instrumentation Amplifier can be used to condition and amplify the signal if it is too weak. This signal after amplified is presented to the component 116 S/H which denotes Sample and Hold. The function of this Sample and Hold is to provide a constant analog signal to the component 118 A/D during the analog to digital convertion. A/D is the Analog-to-Digital convertor which as the name implies converts the analog signal to digital form so that the microprocessor can manipulate. In this design a 12 bit analog-to-digital convertor is used as shown in the data bus of the diagram. This digital signal is presented to the component 124 PIO which denotes Parallel Input and Output device. The PIO is used by the microprocessor for interfacing with the external device. The component 126 CPU is the heart of this microcomputer. CPU which stands for Central Processing Unit is the microprocessor. In this design an 8 bit microprocessor is employed as indicated in the data bus between the PIO and its memory. The memory consists of components 128 PROM which denotes Programmable Read Only Memory and 130 RAM which denotes Ramdom Access Memory. The memory PROM is where the software program resided. The memory RAM is used for storing variables and intermediate data. The control signal as calculated by the microprocessor is presented via component 122 D/A which denotes Digital-to-Analog convertor. This converted analog signal is latched by the component 120 S/H which is another Sample and Hold. The output of this sample and hold circuit denoted AO as Analog Output in the diagram is presented to the electro-mechanical actuator 110. The hardware block diagram presented in FIG. 9 can be simplified with employment of more sophisticated integrated circuits. There are integrated circuits that perform combined functions such as the microcontroller unit 68705 from Motorola which combines the CPU, PROM, RAM and PIO functions into one integrated circuit. In effect, components 124, 126, 128 and 130 can be replaced by one single integated circuit. Further more, some integrated circuits also incorporate the A/D convertors as well such as the microcontrollers 6805 and 6811 from Motorola.

Figure 10:
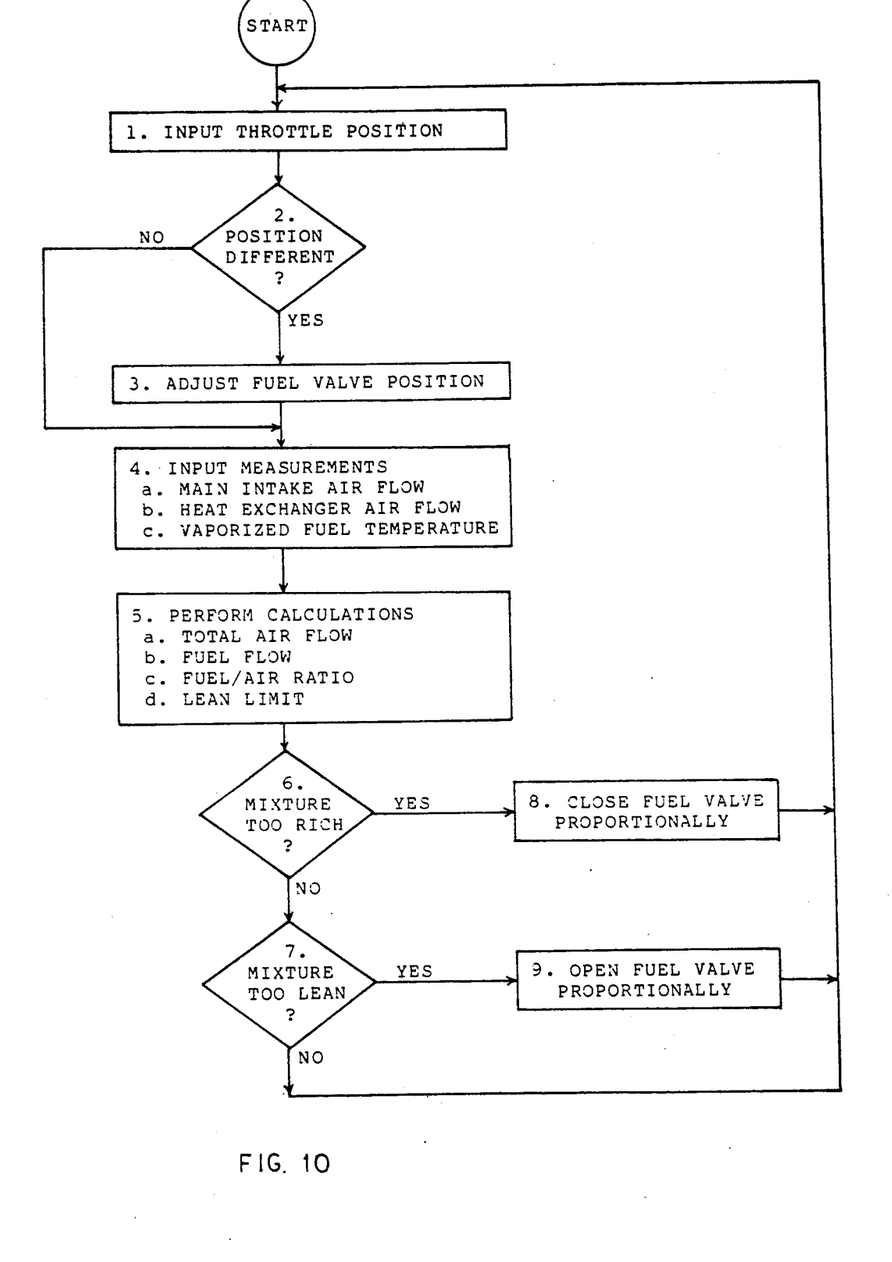
FIG. 10 is the software flow diagram of the air to fuel ratio control algorithm.

FIG. 10 is the software flow diagram for controlling the proper air to fuel ratio, comprising the steps of:

Step 1 reads in the engine throttle valve position which is the engine demand.

Step 2 determines whether the position is different from the last position significantly. If it is not, the program skips the vapour fuel valve adjustment and performs the fuel mixture refinement process.

Step 3 adjusts the vapour fuel valve according to the change of throttle position proportionally. This step is to provide a fast engine response according to the engine demand.

Step 4 reads in the rest of the sensor signals, namely the main intake air flow, heat exchanger air flow and vapour fuel temperature.

Step 5 performs the calculations. They are as follows:
   a: Total air flow is the summation of the main intake air flow and the heat exchanger air flow.
   b: The fuel vapour in the heat exchanger is always maintained in saturated equilibrium, with known fuel vapour temperature and the heat exchanger air flow, the amount of fuel flow can be calculated.

c: Air to fuel ratio is calculated by dividing the total air flow by the fuel flow.

d: The lean limit is obtained by table look up technique. The lean limit is the function of the degree of fuel vaporization. The higher the degree of vaporization the leaner is the lean limit. The lean limit table is obtained by a series of experiments on the engine with different vaporization temperature.

Step 6 tests whether the mixture is too rich compared with the lean limit. If the mixture is too rich, the program proceeds to step 8.

Step 7 tests whether the mixture is too lean compared with the lean limit. If the mixture is too lean, the program proceeds to step 9.

Step 8 closes the vapour fuel valve proportionally according to how rich the mixture is, and proceeds to repeat the algorithm.

Step 9 opens the vapour fuel valve proportionally according to how lean the mixture is, and proceeds to repeat the algorithm.

During the transient situations such as acceleration, deceleration and load variations, the software program always excecutes step 3 to provide fast response to the engine demand. During the steady state, the program skips step 3 and adjusts the vapour fuel valve in step 8 or 9 as necessary. Since the present microprocessor is capable of executing millions of instructions per second and the software program in this design consists of only a few hundred instructions, appropriate time delays or employment of real time scheduling have to be implemented in the control system and the software program to slow down or schedule the execution so that it does not perform the algorithm more than 2 or 3 times a second. The reason is the interfacing mechanical devices are slow in response. To further enhance the operation, more sensors can be added to the control system such as engine speed, engine and ambient temperatures, knock sensor and exhaust emission sensors etc. With this added information, more precise fuel mixture and improved performance can be expected. More precise heat exchanger temperature can be controlled by this microcomputer control system as well. Referring to FIG. 1, temperature sensors can be added to the heat exchanger inlet 44 for measuring the temperature of the combined engine exhaust gas and the recirculation exhaust gas, and to the recirculation exhaust gas 72 and the engine exhaust gas 70. With these signals, a sophisticated temperature control algorithm can be implemented by the microcomputer control system. The heat exchanger temperature can be controlled by this control system via a electro-mechanical actuator on the unison valves 48 and 50.

The embodiments of this invention in which an exclusive property or privilege is claimed are defined as follows:

1. A method of metering the flow of exhaust gas through a heat exchanger connected by a secondary exhaust line to an exhaust line of an internal combustion engine without increasing engine exhaust back pressure, comprising the steps of:
   a) placing a first valve in the exhaust line;
   b) placing a second valve in the secondary exhaust line leading from the exhaust line to the heat exchanger; and
   c) inversely coupling the movement of the first valve and the second valve to maintain a constant cross-sectional area for the flow of exhaust gas, such that as the first valve opens the second valve closes proportionally and as the first valve closes the second valve opens proportionally.

2. An improvement in a vaporization carburetor heat exchanger communicating with a secondary exhaust line leading from an exhaust line of an internal combustion engine, the improvement comprising:
   a) a first valve in the exhaust line;
   b) a second valve in the secondary exhaust line; and
   c) means for inversely coupling the movement of the first valve and the second valve to maintain a constant cross-sectional area for the flow of exhaust gas, such that as the first valve opens the second valve closes proportionally and as the first valve closes the second valve opens proportionally.

3. A method of improving the heat transfer efficiency of a vaporization carburetor heat exchanger, comprising the steps of:
   a) feeding a flow of air laden with liquid droplets of fuel into a first inlet at a top of a heat exchanger such that the fuel laden air follows a first zig zag path from the top to a first outlet positioned at a bottom of the heat exchanger; and
   b) using a blower to create a turbulent counter flow of hot exhaust gas which enters a second inlet at the bottom of the heat exchanger and follows a second zig zag path from the bottom to a second outlet positioned at the top of the heat exchanger, thereby providing the liquid droplets of fuel uniformly high temperatures within which to vaporize.

4. A method of controlling the heat exchanger temperature in a vaporization carburetor heat exchanger having a blower, comprising the steps of:
   a) placing a cooled exhaust gas recirculation line leading from an outlet of a heat exchanger to the inlet of the blower;
   b) placing a valve in a secondary exhaust line leading from an exhaust line of an internal combustion engine to the inlet of the blower;
   c) placing the blower outlet to the inlet of the heat exchanger; and
   d) placing temperature sensitive valve control means at the junction of the recirculation line from the heat exchanger outlet and secondary exhaust line from the exhaust line such that the valve control means adjusts the proportions of exhaust gases from the recirculation line and the exhaust line to maintain the temperature of the gases entering the inlet of the heat exchanger constant at a predetermined optimum temperature.

5. An improvement in a vaporization carburetor heat exchanger having a top, a bottom, a fuel vapour passage arranged in zig zag fashion and communicating with a fuel atomization chamber, a gas flow passage arranged in zig zag fashion and communicating with a secondary exhaust line leading from an exhaust line of an internal combustion engine, the improvement comprising:
   a) the fuel vapour passage having a first inlet at the top, and a first outlet at the bottom of the heat exchanger;
   b) a first blower communicating with the fuel vapour passage thereby creating a flow of fuel laden air through the fuel vapour passage;
   c) the gas flow passage having a second inlet at the bottom, and a second outlet at the top of the heat exchanger;
   d) a second blower communicating with the inlet of the gas flow passage thereby creating a counterflow of exhaust gas, through the gas flow passage, with respect to the fuel vapour flow of the fuel vapour passage;
e) a cooled exhaust gas recirculation line leading from the second outlet to the inlet of the second blower;
f) a valve in a secondary exhaust line leading from the exhaust line of the engine to the inlet of the second blower; and
g) temperature sensitive valve control means at the junction of the recirculation line and the secondary exhaust line such that the valve control means adjusts the proportions of the exhaust gases from the recirculation line and the secondary exhaust line to maintain the temperature of gases entering the second inlet of the heat exchanger constant at a predetermined optimum temperature.

* * * * *